United States Patent [19]

Lerwill

[11] 4,222,455
[45] Sep. 16, 1980

[54] VIBRATION GENERATORS

[75] Inventor: William E. Lerwill, Keston, England

[73] Assignee: Seismograph Service Corporation, Tulsa, Okla.

[21] Appl. No.: 863,237

[22] Filed: Jan. 16, 1978

[30] Foreign Application Priority Data

Oct. 4, 1977 [GB] United Kingdom ............... 41239/77

[51] Int. Cl.³ .............................................. G01V 1/14
[52] U.S. Cl. .................................... 181/121; 181/401; 73/668
[58] Field of Search ........................ 181/113, 121, 401; 340/17; 73/662, 666, 668

[56] References Cited

U.S. PATENT DOCUMENTS

| | | | |
|---|---|---|---|
| 2,706,400 | 4/1955 | Unholtz | 73/666 |
| 3,123,728 | 3/1964 | Kreiskorte | 73/666 |
| 3,516,510 | 6/1970 | Coburn et al. | 340/17 |
| 3,708,033 | 1/1973 | Horsley | 340/17 |
| 4,014,403 | 3/1977 | Mifsud | 181/121 |

FOREIGN PATENT DOCUMENTS

| | | | |
|---|---|---|---|
| 894975 | 4/1962 | United Kingdom | 181/121 |
| 1019978 | 2/1966 | United Kingdom | 181/113 |
| 1116281 | 6/1968 | United Kingdom | 181/113 |
| 1480276 | 7/1977 | United Kingdom | 73/668 |

*Primary Examiner*—Nelson Moskowitz
*Attorney, Agent, or Firm*—Mason, Kolehmainen, Rathburn & Wyss

[57] ABSTRACT

Apparatus for generating vibrations in a medium, such as the ground, comprises a first member which contacts the medium, means, preferably electromagnetic, which includes two relatively movable members for generating vibrations in the apparatus and means operatively connecting the said two members to said first member such that the relatively amplitudes of the movements of said three members can be adjusted to match the impedances of the apparatus and the medium.

6 Claims, 7 Drawing Figures

VIBRATION GENERATORS

FIELD OF THE INVENTION

This invention is concerned with improvements in apparatus for generating vibrations in a medium, including particularly seismic waves in the earth.

BACKGROUND OF THE INVENTION

It may be necessary to generate seismic waves or other vibrations for several purposes, such as:
1. Structural testing by vibration;
2. Communication by seismic signals;
3. Seismic exploration.

The present invention, although capable of other applications, is particularly intended for and will be described as applied to seismic exploration.

Traditional seismic exploration techniques use an explosive energy source in order to map geological formations by recording seismic signals representing the reflected or refracted seismic energy. However, during the last ten years or so an alternative method which is known under the Registered Trade Mark "VIBROSEIS" has been established, in which the signals transmitted are swept frequency signals the duration of which may be many times greater than the total travel time of the signals when received. The resolving power of such a long duration signal is restored by cross-correlating the received signal with that which was transmitted.

Another technique which uses a signal of very long duration is described in U.S. Pat. No. 3,588,802. In this case the input signal may be of constant frequency, but it is necessary to be able to choose a frequency in any part of the seismic spectrum.

Both these extended signal techniques employ transducers (vibrators), which have the following advantage over the conventional use of explosive charges;-
1. The total energy in the signal may be very large but the peak power is relatively small so that there is negligible damage to road or other surfaces or structures where the signal is injected into the earth;
2. Precise control is possible over the phase and amplitude spectrum of the signal.

The second of these advantages has gained a greater significance with the increasing demand for higher resolution seismic surveys in the near-surface parts of the earth; for example, for more detailed mapping of fault zones in coal measures so that pit workings may be planned with greater efficiency.

Vibrators which are designed specifically for seismic exploration on land are usually hydraulic or electromagnetic transducers. The hydraulic transducer has the advantage that it will develop much more force than an electromagnetic transducer of the same size. However, it has the disadvantage that its upper frequency response is restricted to little over 100 Hz; this is mainly due to inertia in the mechanical parts of the hydraulic control system.

The electromagnetic transducer is not so restricted. Frequencies well above 1 kHz, which is beyond that which is useful in seismic exploration, are possible, but the electrical power amplifier necessary to generate the required force must be very large.

Another factor which determines the choice of transducer is the enormous rate of attenuation that occurs at the high frequency end of the spectrum as the seismic wave travels through the earth. In deep exploration for oil, where the wave may be expected to travel down to 30,000 ft. or more, the attenuation of frequency components above 80 Hz is so great that they are virtually lost in the ambient and system noises. Under these circumstances there is little point in using a signal above 100 Hz and, therefore, the hydraulic transducer is adequate. However, in near-surface work, where the depth of interest is between about 100 and 3,000 feet, it is possible to detect reflected signals with components above 200 Hz. Furthermore, the broader band signal that results from extending the frequency spectrum is essential if small details in the earth's layers are to be resolved.

Consequently there is renewed interest in the capability of the electromagnetic transducer, and it is clear that there would be an advantage if the efficiency could be improved so that smaller high-force units could be employed in near-surface exploration.

Existing seismic vibrators were adapted from electromagnetic "shakers" designed for environmental testing in industry. The unit resembles a gigantic drive unit similar to that used in a moving coil loud speaker, except that the "moving coil" is rigidly fixed to a base plate which rests on the ground, while the concentric magnet, which is supported by a spring, acts as the reaction mass. The unit is mounted on a vehicle which, in addition to containing the electrical power supply source, acts as a hold-down weight on the base plate so it does not leave the ground when the acceleration on the reaction mass exceeds that of gravity. Electrical power is converted into power in the form of seismic waves with an efficiency estimated to be about 1%.

OBJECTS OF THE INVENTION

It is an object of the present invention to provide apparatus for generating vibrations in a medium, such as the ground, by means of which the desired vibrations can be produced in the medium with greater efficiency than with prior apparatus working on a similar principle.

A further object is to provide such apparatus in which the efficiency can be improved by matching the mechanical output impedance of the apparatus to the impedance presented by the medium and the reaction mass of the apparatus.

A still further object of the invention is to provide such apparatus which is suitable for generating seismic waves in the ground, particularly for seismic exploration, and which incorporates an electromagnetic vibrator or transducer to generate the vibrations.

Another object of the invention is to provide apparatus for generating vibrations in a medium, which apparatus comprises three members one of which is adapted to engage the medium and two of which generate vibrations relative to each other, wherein the three members are connected together mechanically by means, such as levers, which allow the relation of the amplitude of the movements of the first said member relatively to the movements of the other two members to be adjusted to improve the efficiency.

SUMMARY OF THE INVENTION

In the description which follows it will be shown, by means of electrical analogies of the earth and the transducer, how, in theory, the efficiency can be improved by means of a matching transformer. It will also be shown how the effect of a matching transformer can be achieved in practice by mechanical means, such as a system of levers, and how the matching ratio may be adjusted to correct for changes in signal frequency and the compliance of the ground.

The invention, in one of its aspects provides apparatus for generating vibrations in a medium comprising an electromagnet having a core with an air gap and a winding, a vibrating member adapted to make contact with the medium to generate vibrations therein, a moving coil operating in the said gap under the action of the electromagnet and means operatively connecting the core, the coil and the vibrating member such that the ratio, which may be adjustable, between the amplitudes of the movements of the coil relatively to the core and of the core relatively to the vibrating member is greater or less than one.

Although the invention might be applied to the production of vibrations in a liquid medium, it is primarily intended for use with solid media, particularly the ground, in which the vibrating member is arranged to make direct contact with the ground. It is preferably formed as a base which is designed to be placed on the surface of the ground and is used to support the electromagnet and the coil through the said connecting means. These connecting means, which support the electromagnet and coil above the base and transmit vibrations to the latter, are mechanically connected by coupling means. These preferably take the form of a number of levers, which are mechanically connected, at points spaced along them, to the core, the coil and the base, as will be described.

In a preferred construction, a number of levers are arranged radially with respect to the common axis of the coil and electromagnet and are pivotally connected at their inner and outer ends to the coil and the core, respectively, while being pivotally supported from the base at points intermediate their ends. This pivotal support may be provided by blocks which act as fulcra or bearings and which are preferably adapted to be moved inwardly or outwardly by screws or other means to adjust the ratio between the amplitudes of the movements of the coil relatively to the core and of the core relatively to the base. It is this adjustment which makes it possible to match the mechanical output impedance of the vibrator constituted by the electromagnet and coil to the impedance presented by the ground and the vibrations.

The invention will now be more fully described, by way of example, with reference to the accompanying drawings, in which:

DESCRIPTION OF PRESENTLY PREFERRED EMBODIMENT

Figure 1:
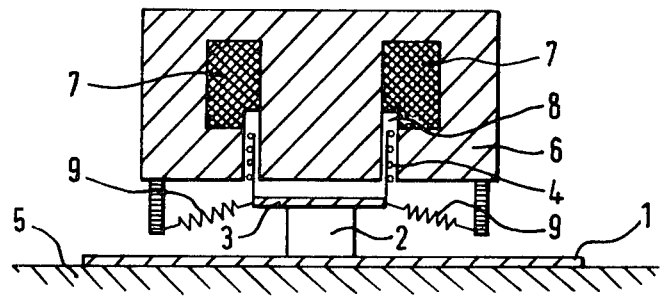
FIG. 1 is a diagrammatic sectional view showing a conventional electromagnetic vibrator operating on the earth's surface.

FIG. 1 shows diagrammatically and in section the basic components of a conventional electromagnetic vibrator unit. This comprises a base 1 carrying a column 2 with a head 3 on which a drive coil 4 is rigidly fixed. The base 1 is planted firmly on the ground 5. The reaction mass consists of an iron core 6 and a field coil 7 which fit concentrically over the drive coil 4, which operates in a gap 8. The core 6 and coil 7 are resiliently supported for vertical movement relatively to the base 1 by suspension springs 9 the ends of which are connected to the core 6 and to the head 3 of the column 2. When the drive coil is supplied with a current the reaction mass receives an upward or downward force which depends upon the direction of and is proportional to the strength of the current, according to the formula:

$$F = Bli$$

where
F = force (Newtons);
B = flux density in air gap 8 (Webers/m$^2$);
l = length of wire in coil 7 (meters).

When an alternating current is supplied to the coil 7 an alternating force acts on the reaction mass and an equal and opposite force acts on the base 1, which generates the required seismic wave in the ground.

Figure 2:
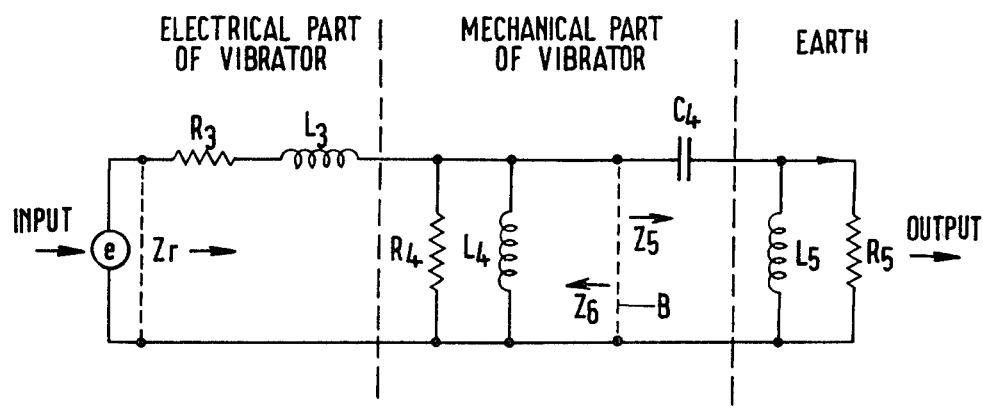
FIG. 2 shows the analogue of such a conventional vibrator.

At this point it is convenient to take advantage of the similarity, which is well known, between the equations of motion and those that describe the behaviour of components in an electrical circuit. The circuit in FIG. 2 is the mass-capacitance analogue of the transducer operating with the ground as illustrated in FIG. 1, and the components are set out in the following table, it being noted that S.I. units are used throughout.

| Description | Mechanical | Electrical Symbol | |
|---|---|---|---|
| Reaction Mass | M | M/(Bl)$^2$ | C$_4$ |
| Spring Compliance | C$_v$ | C$_v$(Bl)$^2$ | L$_4$ |
| Frictional Loss | R$_v$ | (Bl)$^2$/R$_v$ | R$_4$ |
| Force Mẍ | F | current | i (r.m.s.) |
| Particle Velocity | ẋ | voltage | v (r.m.s.) |
| Displacement | x | | |
| Ground Compliance | G$_g$ | C$_g$(Bl)$^2$ | L$_5$ |
| Radiation Resistance | R$_g$ | | R$_5$ |
| Drive Coil Inductance | | | L$_3$ |
| Drive Coil Resistance | | | R$_3$ |
| Flux Linkage | | | Bl |
| Input Voltage | | | e (r.m.s.) |

It is now possible to use the more familiar network equations to find the overall efficiency of the system, in which:

Z$_T$ = the total impedance presented to the input. This contains real and imaginary components and may therefore also be written:

$$Z_T = R_T + jX_T$$

R$_T$ being the real or resistive part, and
X$_T$ being the imaginary or reactive part.
Z$_5$ = the modulus of the impedance at point B in FIG. 2 "looking" to the right, that is towards the reaction mass coupled to the ground;
Z$_6$ = the modulus of the impedance at point B "looking" towards the left, i.e. the input.

If the total power dissipated in the network is P$_T$ then:

$$P_T = (e/|Z_T|)^2 \cdot R_2$$

where
e = r.m.s. input voltage;
$R_T$ = the real part of $Z_T$.

The power radiated into the ground in the form of transverse and compressional seismic waves is equivalent to the power dissipated in $R_5$. Thus, if the radiated power is $P_R$, then:

$$P_R = v^2_5/R_5$$

where $v_5$ is the voltage across $R_5$.

Thus the overall efficiency of the transducer is given by the ratio:

$$\text{Efficiency} = P_R \times 100/P_T$$

Figure 3:
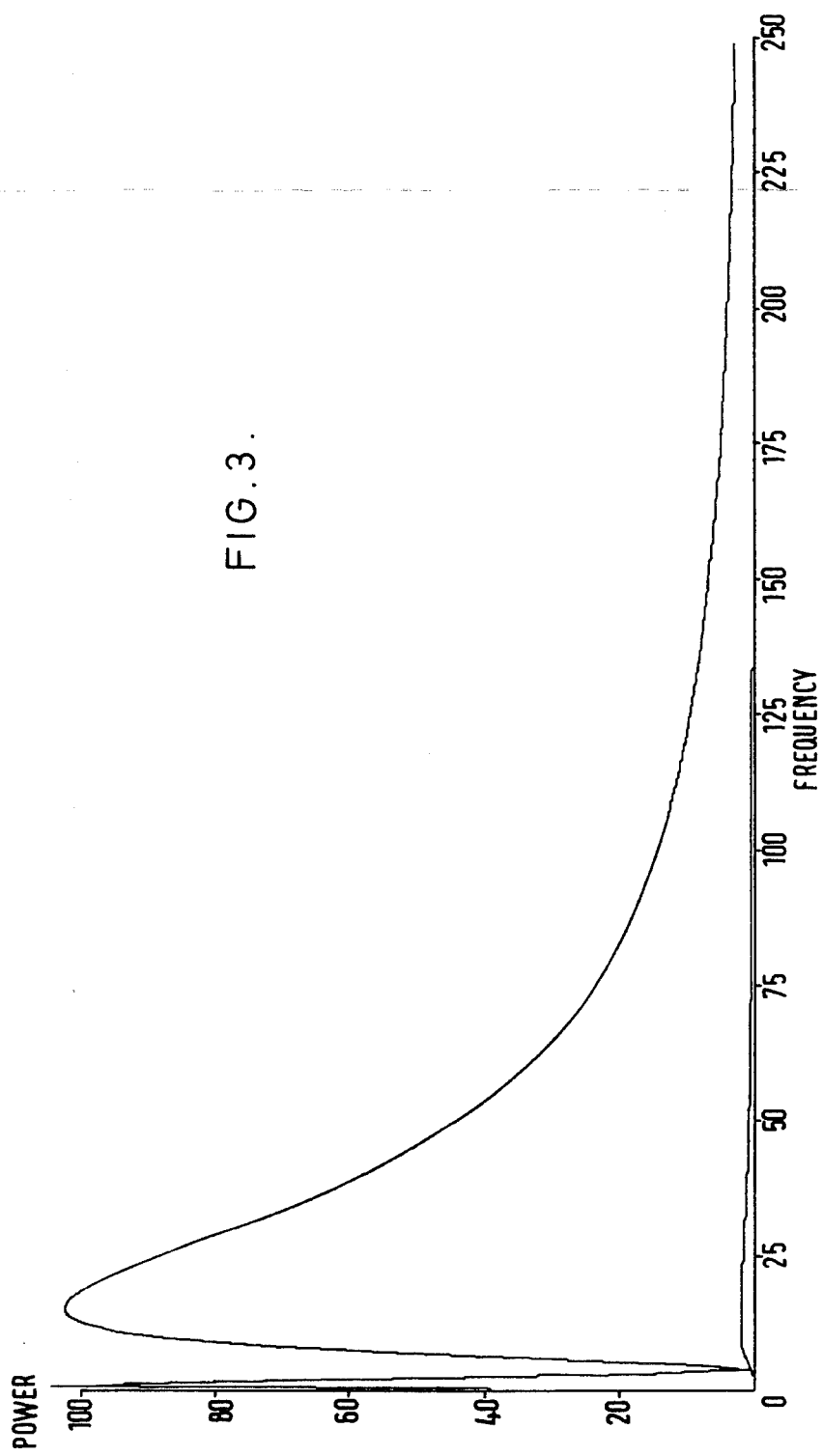
FIG. 3 shows the power/frequency response which was obtained with such a vibrator.

The parameters of a typical seismic transducer were fed into a digital computer model based upon the analogy in FIG. 2, and the result obtained is shown on the graph in FIG. 3. The total input power $P_T$, and the output power $P_R$ are plotted over a frequency range covering that which is normally encountered in seismic exploration, which is about 5 to 250 Hz. Notice that the output is small compared with the input power; the efficiency is about 1.5% Also, the response is poor at the high frequency end of the spectrum.

In electrical circuits having a source and a load the maximum power will be delivered by a source when its internal impedance equals that of the load. If there is a significant difference between the impedances, the situation can be improved by connecting between the source and the load a matching transformer with a primary to the secondary turns ratio T such that $$T = (Z_L/Z_S)^{\frac{1}{2}}$$

where:
$Z_L$ = the load impedance and
$Z_S$ = the source impedance.

When the primary and secondary circuits of such a transformer include reactive components, the impedances of these circuits will vary with frequency. Consequently, in electrical systems with such circuits it may not be possible to obtain a best match over a band of frequencies and some compromise is then necessary, for example by choosing impedances which come in the center of the desired frequency band when calculating the turns ratio of the transformer.

Figure 4:
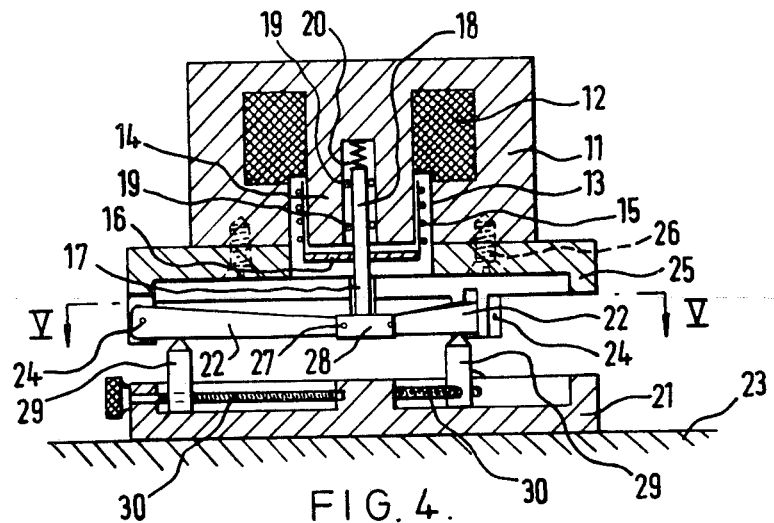
FIG. 4 is a sectional view showing an electromagnetic vibrator exemplifying the present invention.
Figure 5:
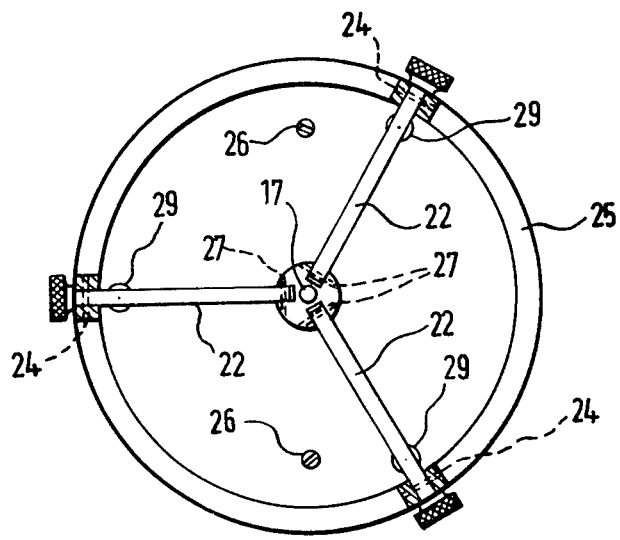
FIG. 5 is a section taken on the line V—V of FIG. 4.

Referring now to FIGS. 4 and 5, these show in vertical and horizontal section a vibrator or transducer which exemplifies the present invention and which has been designed for seismic work. The vibrator comprises a magnetic core 11 which contains a winding 12 and is formed with an annular air gap 13 around its center 14. A coil 15 fixed to a plate 16 is reciprocable in the air gap 13, as with known vibrators, and it is guided in such movement by a central rod 17 to which the plate 16 is attached, which rod 17 is slidable in an axial bore 18 in the core 11, suitable anti-friction means, indicated generally at 19, being provided. A compression spring 20 in the bore 18 supports the core 11 with the winding 12 for vertical oscillation relatively to a base 21 on which it is supported through levers 22 as will be described. The base 21 is intended to rest on the ground 23 and to transmit vibrations into the latter.

The outer ends of the levers 22 are pivoted at 24 to a plate 25 which is fixed by screws 26 to the bottom of the core 11. The inner ends of these levers 22 are pivotally connected at 17 to a collar 28 fixed on the rod 17, using means such as pin-and-slot connections which provide sufficient play to allow limited angular movement of the levers 22 when the vibrator is operated.

The vibrator, with its core 11, winding 12, coil 15 and other parts which have been described, are supported by pivotal engagement between the levers 22 and posts 29 which are mounted on the base 21. The posts 29 are movable radially on the base 21 by suitable means, such as threaded rods 30 and their distances from the center can be adjusted to vary the mechanical advantage provided by the levers 22 between the vibrator and its base.

Figure 6:
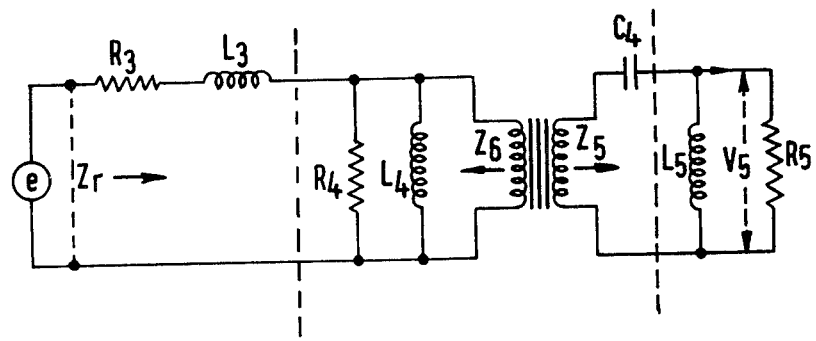
FIG. 6 is the analogue of such an improved vibrator with its impedance matching.

Referring now to FIG. 6 the circuit here shows how a transformer may be included in the transducer analogue of FIG. 2 in order to improve the efficiency. Here, the load impedance is $Z_5$, which includes the reaction mass and the ground components. The source impedance is $Z_6$, which is the impedance "looking" back to the input. The turns ratio of the transformer is $T_1$. If $$T_1 = (Z_6/Z_5)^{\frac{1}{2}}$$

the maximum power will be transferred to the ground at the frequency which was selected to calculate the impedances $Z_6$ and $Z_5$.

Figure 7:
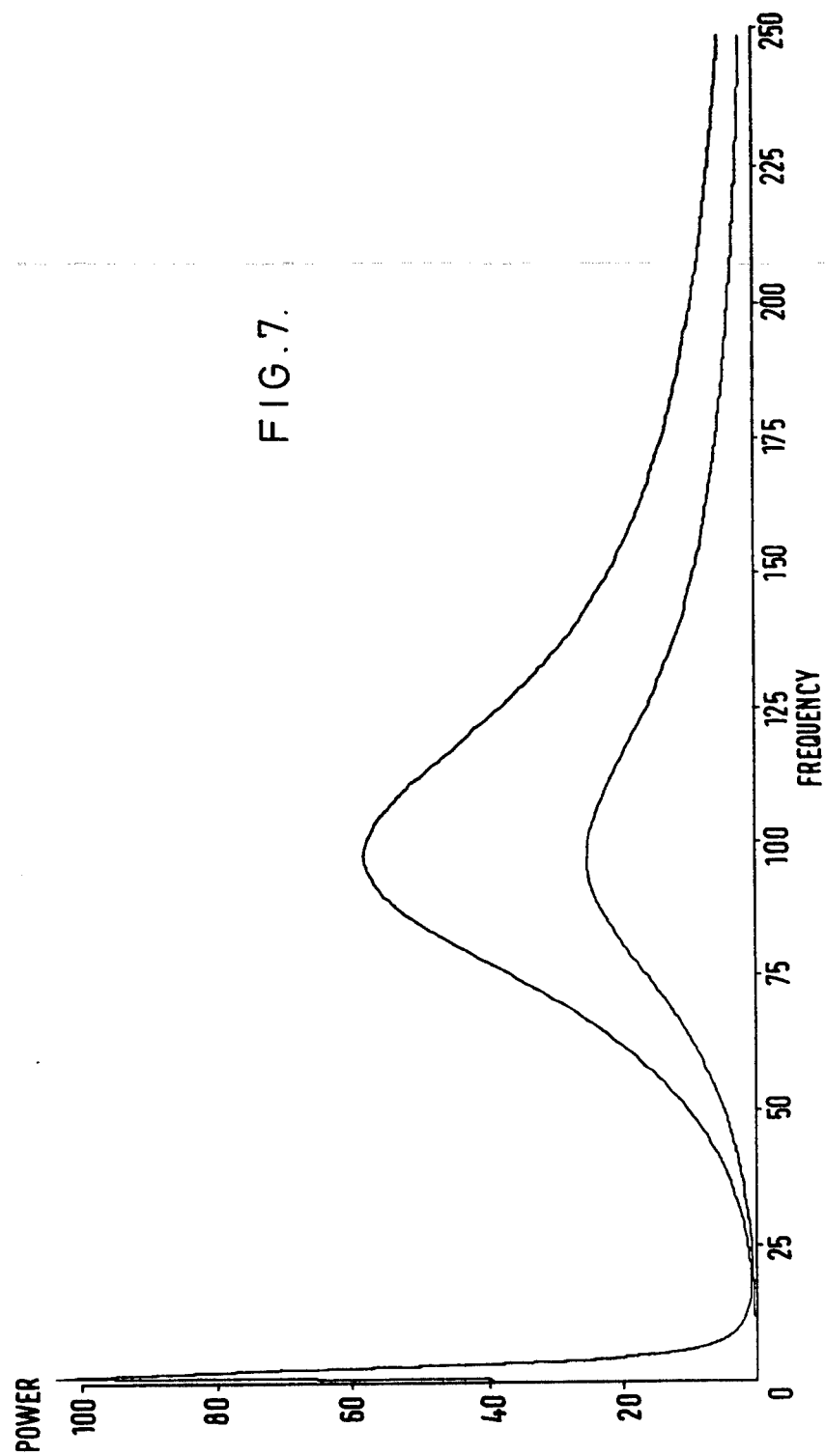
FIG. 7 is a graph showing the response which was obtained with this improved vibrator.

The graph in FIG. 7 shows the response obtained with the modified circuit shown in FIG. 6 when the turns ratio of the transformer was calculated to give the best match at 100 Hz. It will be noted that the impedance match not only improves the response at 100 Hz, but the output to input power ratio is increased over most of the band; the efficiency is now about 40%.

It should be appreciated that the transformer in FIG. 6 is an "ideal" analogy with none of the losses that would normally exist in a real electrical transformer, or its mechanical equivalent. Also, the components $L_5$ and $R_5$, which represent compliance and radiation resistance, will vary considerably according to the type of ground, which may be a very hard rock or soft clay. However the theoretical model shown in FIG. 4 adequately describes the principle of this invention.

Referring again to FIG. 4 it will be understood that a downward force from the drive coil 15 will exert an upward force on the reaction mass represented by the core and its winding. The radial position of each fulcrum 29 can be adjusted by means of its screw 30 so that the ratio (or the mechanical advantage) of the lever system is also adjustable.

Thus the apparatus illustrated in FIGS. 4 and 5 are the mechanical equivalent of the circuit of FIG. 6, but with one important improvement. This is that the system of levers and fulcra which act as the impedance matching transformer allow a continuously variable ratio, which is determined by the radial positions of the fulcra. Consequently a "best match" may be obtained for a wide range of ground impedances or frequencies simply by turning the screws 30.

It will be appreciated that other mechanical means for adjusting the fulcra are possible, the essential requirement being that the radial positions of the fulcra should be variable.

According to a further embodiment of this invention the radial positions of the fulcra could be remotely controlled by means of a motor, so that the transformer ratio is adjusted to suit the input frequency to the transducer. Furthermore, the motor might be part of a servo control loop which automatically adjusts the ratio so that maximum signal is obtained from a sensor buried in the ground. This would ensure optimum performance from the transducer when there is a wide variation in the characteristic impedance of the ground.

A main advantage of the invention is, however, that it makes it possible to improve the efficiency of an electromagnetic transducer or vibrator so that smaller units may be designed for high resolution seismic survey.

I claim:

1. Apparatus for generating seismic vibrations in the ground comprising an electromagnet having a core with an air gap and a winding, a base adapted to rest on the ground to generate vibrations therein, an operating coil which is reciprocated in said gap by electromagnetic action with said electromagnet and means operatively connecting said core, said coil and said base, such that the ratio between the amplitudes of the movements of said coil relatively to said core and of said core relatively to said base is different from unity and is adjustable, said connecting means comprising a plurality of levers and means making pivotable connection between each of said levers, at points spaced along it, with said core, said coil and said base.

2. Apparatus according to claim 1, wherein said connecting means comprise at least three levers arranged radially about a common axis, means connecting said levers with said core and with said coil, pivot members carried by said base for pivotally supporting said levers and means for adjusting the positions of said pivot members along said levers for varying the ratio between said relative movements.

3. Apparatus according to claim 1, which includes resilient means carried by said levers for supporting said core with its winding while allowing relative movement between them and said coil.

4. Apparatus for generating vibrations in a solid medium, such as the earth, comprising a base adapted to rest on the medium and means for producing vertical vibrations of said base to generate vibrations in said medium, said means comprising an annular magnetic core provided with a winding and with an annular air gap, a coil in said air gap concentric therewith and with said core, a plurality of levers arranged radially about the axis of said core and coil, means pivotally connecting the outer ends of said levers with said core and the inner ends thereof with said coil, pivot means carried by said base for pivotally supporting said levers at points between their ends and thereby supporting said core with its winding and sail coil, such that vibrations of said core and coil relative to each other produce vertical vibrations of said base, the relative amplitudes of said vibrations being determined by the relative positions of said pivot points along said levers, and screw threads for moving said pivot points along said levers.

5. Apparatus according to claim 4, wherein said core is formed with an axial bore and a rod is provided which is connected rigidly to said coil and pivotally to the inner ends of said levers, said rod being axially movable in said bore.

6. Apparatus according to claim 4, wherein a spring is provided between the inner ends of said levers and said core to support the latter while allowing vertical relative movement between said core with its winding and said coil.

* * * * *